United States Patent
Rabenko et al.

(10) Patent No.: US 7,936,744 B2
(45) Date of Patent: May 3, 2011

(54) NETWORK TELEPHONY SYSTEM

(75) Inventors: Ted F. Rabenko, Duluth, GA (US); Ian Crayford, San Jose, CA (US); David L. Hartman, Jr., Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1444 days.

(21) Appl. No.: 11/077,523

(22) Filed: Mar. 10, 2005

(65) Prior Publication Data

US 2005/0152346 A1 Jul. 14, 2005

Related U.S. Application Data

(62) Division of application No. 09/452,043, filed on Nov. 30, 1999, now Pat. No. 6,885,657.

(60) Provisional application No. 60/110,211, filed on Nov. 30, 1998.

(51) Int. Cl.
*H04L 12/66* (2006.01)

(52) U.S. Cl. ........ 370/352; 370/252; 370/389; 370/400; 370/411; 709/223

(58) Field of Classification Search .......... 370/353, 370/354, 356, 412, 429, 235, 236, 244, 352, 370/360, 392, 395.3, 409, 411, 450, 462, 370/229, 231, 252, 389, 395, 400; 713/153; 709/223

See application file for complete search history.

(56) References Cited

U.S. PATENT DOCUMENTS

| | | | |
|---|---|---|---|
| 4,500,987 A * | 2/1985 | Hasegawa | 370/462 |
| 4,644,533 A * | 2/1987 | Braff et al. | 370/411 |
| 4,872,160 A | 10/1989 | Hemmady et al. | |
| 5,130,985 A * | 7/1992 | Kondo et al. | 370/400 |
| 5,235,595 A * | 8/1993 | O'Dowd | 370/392 |
| 5,271,000 A * | 12/1993 | Engbersen et al. | 370/244 |
| 5,341,374 A * | 8/1994 | Lewen et al. | 370/450 |
| 5,432,775 A | 7/1995 | Crayford | |
| 5,452,289 A | 9/1995 | Sharma et al. | |
| 5,471,470 A | 11/1995 | Sharma et al. | |
| 5,550,803 A | 8/1996 | Crayford et al. | |
| 5,577,041 A | 11/1996 | Sharma et al. | |
| 5,600,649 A | 2/1997 | Sharma et al. | |
| 5,610,903 A | 3/1997 | Crayford | |

(Continued)

FOREIGN PATENT DOCUMENTS

EP 0 669 749 A1 8/1995

(Continued)

OTHER PUBLICATIONS

NBX 100 Communications System by 3COM, www.3com.com/products/voice_solutions.html, 3pp.

(Continued)

*Primary Examiner* — Gerald Gauthier
(74) *Attorney, Agent, or Firm* — Sterne, Kessler, Goldstein & Fox P.L.L.C.

(57) ABSTRACT

The present invention includes a network telephone having a microphone coupled to provide voice data to a network, a speaker coupled to facilitate listening to voice data from the network, a dialing device coupled to facilitate routing of voice data upon the network, a first port configured to facilitate communication with a first network device, a second port configured to facilitate communication with a second network device and a prioritization circuit coupled to apply prioritization to voice data provided by the microphone.

24 Claims, 7 Drawing Sheets

U.S. PATENT DOCUMENTS

| | | | |
|---|---|---|---|
| 5,673,254 A * | 9/1997 | Crayford | 370/231 |
| 5,757,281 A * | 5/1998 | Schwendeman et al. | 340/7.23 |
| 5,764,627 A | 6/1998 | Sharma et al. | |
| 5,790,532 A | 8/1998 | Sharma et al. | |
| 5,835,571 A * | 11/1998 | Johnson | 379/88.01 |
| 5,859,837 A | 1/1999 | Crayford | |
| 5,940,392 A * | 8/1999 | Lo et al. | 370/392 |
| 5,978,853 A | 11/1999 | Crayford et al. | |
| 6,016,308 A * | 1/2000 | Crayford et al. | 370/252 |
| 6,075,784 A * | 6/2000 | Frankel et al. | 370/356 |
| 6,128,666 A * | 10/2000 | Muller et al. | 709/238 |
| 6,169,734 B1 * | 1/2001 | Wilson | 370/352 |
| 6,181,699 B1 * | 1/2001 | Crinion et al. | 370/392 |
| 6,229,789 B1 * | 5/2001 | Simpson et al. | 370/235 |
| 6,304,577 B1 * | 10/2001 | Nagami et al. | 370/409 |
| 6,487,196 B1 * | 11/2002 | Verthein et al. | 370/352 |
| 6,519,636 B2 * | 2/2003 | Engel et al. | 709/223 |
| 6,546,009 B1 | 4/2003 | Begeja et al. | 370/389 |
| 6,563,793 B1 * | 5/2003 | Golden et al. | 370/236 |
| 6,570,869 B1 * | 5/2003 | Shankar et al. | 370/352 |
| 6,625,472 B1 * | 9/2003 | Farazmandnia et al. | 455/557 |
| 6,658,565 B1 * | 12/2003 | Gupta et al. | 713/153 |
| 6,678,280 B1 | 1/2004 | Kim et al. | |
| 6,885,657 B1 * | 4/2005 | Rabenko et al. | 370/352 |
| 6,940,814 B1 * | 9/2005 | Hoffman | 370/235 |
| 7,227,859 B1 * | 6/2007 | Finn et al. | 370/354 |
| 7,327,748 B2 * | 2/2008 | Montalvo et al. | 370/412 |
| 7,349,333 B2 * | 3/2008 | Zellner | 370/229 |
| 7,366,164 B1 * | 4/2008 | Habib et al. | 370/356 |
| 7,463,625 B2 * | 12/2008 | Salett et al. | 370/360 |
| 2002/0075815 A1 * | 6/2002 | Sharma et al. | 370/276 |
| 2005/0152346 A1 * | 7/2005 | Rabenko et al. | 370/352 |
| 2006/0083221 A1 * | 4/2006 | Yanai et al. | 370/352 |

FOREIGN PATENT DOCUMENTS

| | | |
|---|---|---|
| EP | 0 851 653 A2 | 7/1998 |
| WO | WO 98/06201 | 2/1998 |
| WO | WO 98/44703 | 10/1998 |

OTHER PUBLICATIONS

NBX Business Telephone by 3COM, www.3com.com/products/nbx_telephone_features.html, 1pg.

* cited by examiner

NETWORK TELEPHONY SYSTEM

RELATED APPLICATION

This patent application is a divisional of U.S. patent application Ser. No. 09/452,043, filed Nov. 30, 1999 now U.S. Pat. No. 6,885,657, which claims the benefit of the filing date of U.S. Provisional Patent Application Ser. No. 60/110,211, filed Nov. 30, 1998 and entitled 3 PORT ETHERNET SWITCH AND MICROPROCESSOR FOR VOICE COMMUNICATION, the entire contents of which are hereby expressly incorporated by reference.

FIELD OF THE INVENTION

The present invention relates generally to computer network systems. The present invention relates more particularly to a system for facilitating telephony over a computer network, such as an Ethernet network.

BACKGROUND OF THE INVENTION

Ethernet networks and the like for providing data communication among a plurality of computers are well-known. Such networks facilitate the transfer of data files, audio information and video information, as well as any other information which may be represented in binary form, among the plurality of computers.

Typically, one or more of the computers is configured as a server and generally defines a repository for frequently used files. The other, e.g., non-server, computers are generally referred to as clients and may frequently receive files from the server. Client computers may also communicate information to one another.

Although common, servers are not a necessary part of all networks. In peer-to-peer networks, client or non-server computers communicate among one another to facilitate file transfer.

Networks can be conveniently divided into two broad categories, based upon their size. A local area network (LAN) is a group of computers which are connected so as to facilitate the sharing of applications, data and peripherals. Local area networks are generally confined to a single building or a small group of buildings.

A wide area network (WAN) is made up of a plurality of LANs which are connected together so as to facilitate communication therebetween. A WAN may cover a city, a state, a country or even be international in scope. The Internet is an example of a WAN that includes more than 2,000 separate packet-switched networks that are located all over the world.

Networks, particularly WANs, are typically interconnected by a variety of network devices such as hubs, switches, routers and/or bridges.

A hub is a multiport repeater that facilitates the interconnection of a plurality of computers (one for each port of the hub).

A switch is a network device which is capable of reading and modifying header information associated with data packets, including header information which specifies the priority with which the data packets are to be queued within a buffer of a network device (including the switch itself).

A router is a network device that interconnects a plurality of separate LANs or WANs, wherein each of the networks utilizes the same network protocol and operates at the network layer, or Layer 3, of the ISO model.

A bridge is a network device that interconnects a plurality of separate LANs or WANs, wherein at least two of the networks utilize a different network protocol with respect to one another and operates at the Data Link/MAC layer, or Layer 2 of the ISO model.

The popularity of the Internet has increased the desire for additional network services such as network telephony. The vast, high bandwidth network which defines the Internet provides an ideal medium for audio communications.

Thus, it is desirable to provide a system for facilitating audio communication over networks such as the Internet.

SUMMARY OF THE INVENTION

The present invention includes a network telephone having a microphone coupled to facilitate provision of voice data to a network, a speaker coupled to facilitate listening to voice data from the network, a dialing device coupled to facilitate routing of voice data upon the network, a first port configured to facilitate communication with a first network device, a second port configured to facilitate communication with a second network device and a prioritization circuit coupled to apply prioritization to voice data provided by the microphone.

DETAILED DESCRIPTION OF THE INVENTION

Figure 1:
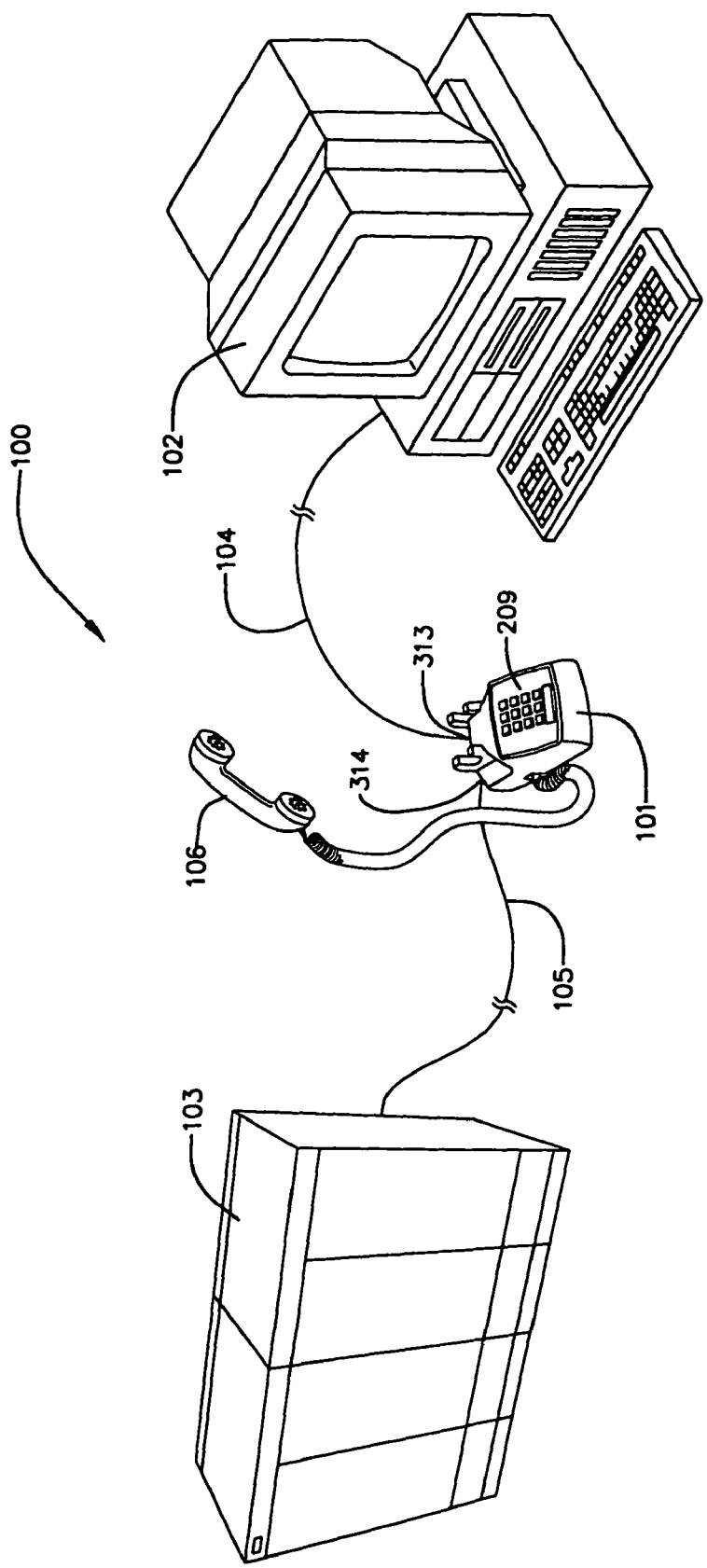
FIG. 1 is a drawing showing the network telephone of the present invention electrically installed between a first network device, e.g., a personal computer and a second network device, e.g., a network switch.

The detailed description set forth below in connection with the appended drawings is intended as a description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Although the present invention is described below and illustrated in the drawings as being configured for use in an Ethernet network, those skilled in the art will appreciate that the network telephone of the present invention is likewise suitable for use in various other network environments. Thus, description and illustration of the network telephone in an Ethernet network is by way of example only and not by way of limitation.

The present invention includes a network telephone having a microphone coupled to facilitate provision of voice data to a network, a speaker coupled to facilitate listening to voice data from the network, a dialing device coupled to facilitate routing of voice data upon the network, a first port configured to facilitate communication with a first network device, a second port configured to facilitate communication with a second network device and a prioritization circuit coupled to apply prioritization to voice data provided by the microphone and detect prioritization of traffic received from either one or both of the network ports. The prioritization circuit is optionally coupled to apply prioritization to voice data communicated to the network telephone via the first and/or second ports.

The first port is configured to facilitate communication of voice packets and non-voice packets with the first network device such as a personal computer, and the second port is similarly configured to facilitate communication of voice packets and non-voice packets with the second network device such as a network switch. The first and second ports optionally comprise Ethernet 10/100 ports.

The microphone and the speaker are optionally part of a handset. The dialing device may be defined by a keypad. However, those skilled in the art will appreciate that various other types of dialing devices, e.g., touchpads, voice control, etc., are likewise suitable.

According to one aspect of the present invention, the prioritization circuit is configured to tag voice packets, so as to facilitate prioritization thereof. The prioritization circuit is also configured to read tags associated with data packets provided to the network telephone by the network. Thus, data packets being transmitted from the network telephone to the network are processed by the network according to the priority assigned by the prioritization circuit and data packets received by the network telephone are similarly processed according to their assigned priority, as discussed in detail below.

According to one aspect of the present invention, the prioritization is defined by a network switch, such as an Ethernet switch. As those skilled in the art will appreciate, a network switch may be configured to add tags to data packets which pass therethrough, so as to associate a priority with the data packets. The priority determines the order of processing by various network devices. The integral network switch of the network telephone of the present invention functions as a network switch controller, since the integral network switch of the network telephone uses such tags to effect control of network switches throughout the network.

A voice engine processor in communication with the network switch is configured to digitize and compress voice data from the microphone and to decompress and perform digital-to-analog conversion upon voice data provided to the speaker. The voice engine processor is also configured to depacketize voice data which is being provided to the speaker (typically from the network) and to packetize voice data which is provided by the microphone.

Thus, according to the present invention, the Internet Protocol switch controller functions as a network switch, so as to facilitate the prioritization of voice data packets. As those skilled in the art will appreciate, the prioritization of voice data packets tends to assure that the voice data packets are not undesirably delayed as they are routed across a network, such as the Internet, from the source network telephone to another network telephone or the like.

Of course, such delays are undesirable because they cause the speech to be interrupted or broken, and may, indeed, result in lost voice packets which cause the speech to be garbled or otherwise unintelligible.

By adding prioritization to voice data which originates at the network telephone of the present invention, the voice data packets tends to be queued ahead of other, lower priority, data packets at various network devices which perform buffering, such as switches, routers, bridges, hubs and the like. The addition of priority to voice data packets assures prompt processing of the voice data packets by network devices.

The network telephone of the present invention is suitable for use in various different types of networks, including but not limited to LANs, WANs, intranets and internets, as well as the Internet.

Referring now to FIG. 1, a network telephone system 100 includes a network telephone 101 electrically connected between a first network device such as a personal computer 102 and a second network device, such as a hub, router, bridge, other network computer or switch 103. The network telephone 101 is electrically connected to the personal computer 102 via cable 104 which attaches to a first input/output port 313 of the network telephone 101. Similarly, the Internet telephone 101 is connected to the network switch 103 via cable 105 which attaches to input/output port 314 of the network telephone 101.

Thus, according to the present invention, installation of a network telephone 101 simply involves disconnecting an existing cable between a personal computer 102 and a network device such as a network switch 103, and connecting the network telephone 100 between the personal computer 102 and the network switch 103. Thus, the network telephone 101 is merely inserted in series between the personal computer 102 and the network switch 103 such that the network telephone may then intercept voice data packets from the network and may insert voice data packets onto the network.

Not only must the Internet telephone 101 facilitate transmission and reception of voice data packets to and from the network but the network telephone 101 must also allow data packets from the network to be transmitted to the personal computer 102 and allow data packets transmitted from the personal computer 102 to be forwarded to the network.

However, as those skilled in the art will appreciate, the personal computer 102 is not required for the network telephone 101 to function. Thus, the network telephone 101 may alternatively be electrically connected only to the network switch 103 or some other network device. Indeed, those skilled in the art will appreciate that the network telephone 101 may be connected in a variety of different manners to the network, including but not limited to a radio connection, an infrared connection, a fiber optic connection or any other desired type of connection.

Although FIG. 1 depicts a conventional telephone, having a keypad 209 and a handset 106, those skilled in the art will appreciate that various other telephony devices are likewise suitable. For example, the network telephone 101 may comprise a headset and may alternatively utilize voice recognition for dialing. Indeed, the network telephone 101 may define any desired configuration of voice telephone.

Figure 2:
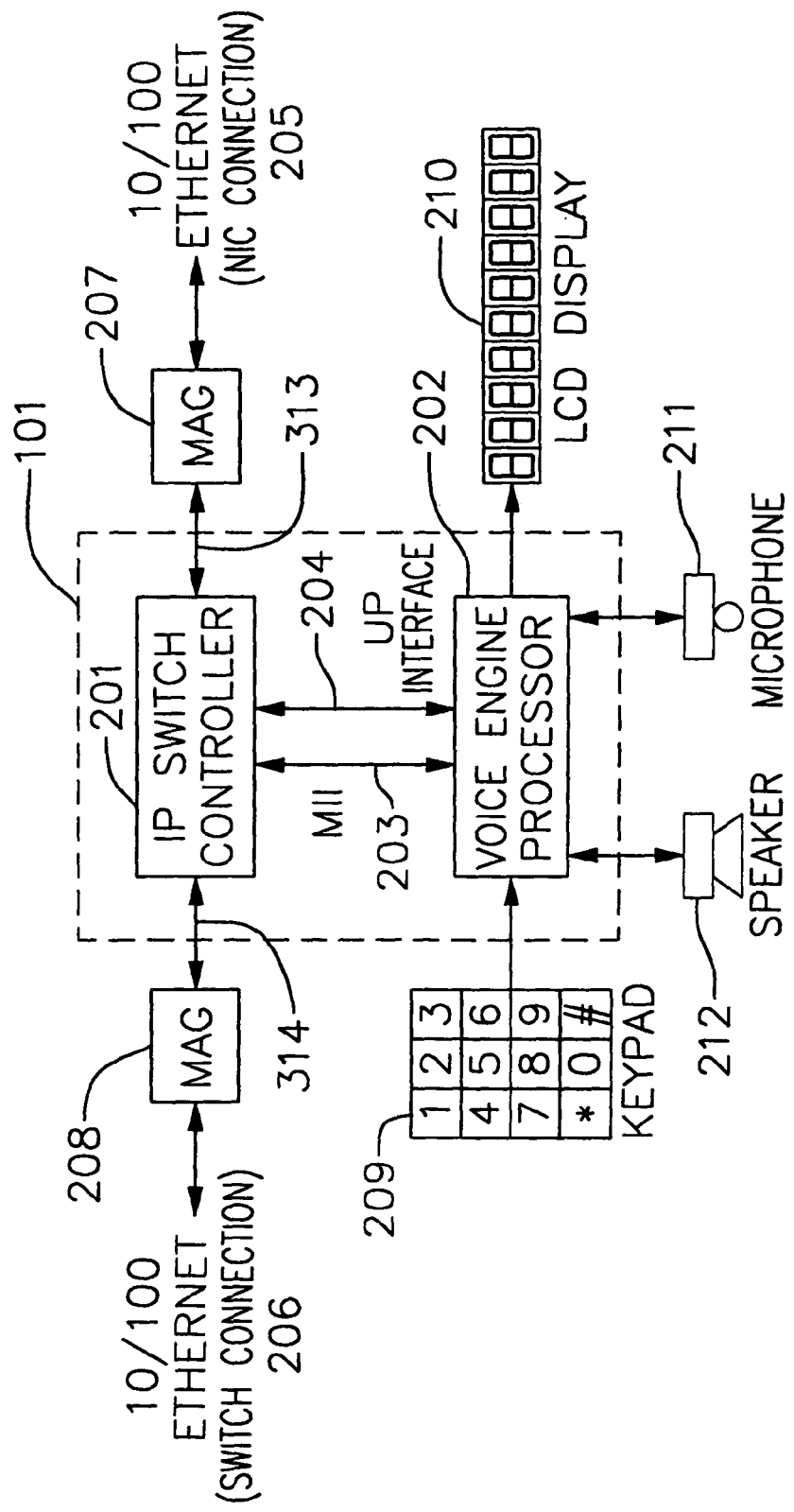
FIG. 2 is a block diagram showing the network telephone generally.

Referring now to FIG. 2, the network telephone 101 comprises an Internet Protocol switch controller 201 and a voice engine processor 202 which cooperate to facilitate telephonic communication via a network, such as the Internet. The Internet Protocol switch controller 201 and the voice engine processor 202 are each formed as separate, single chips. However, future integration may allow these as well as other functions to be implemented in a single chip. The Internet Protocol switch controller 201 facilitates the application of enhanced priority to voice packets in order to assure that the voice packets are not undesirably delayed during transmission to a recipient via the network, as described in detail below. The voice engine processor 202 performs analog-to-digital conversion upon voice from microphone 211, compresses the digitized voice and packetizes the digitized voice for transmission upon the network. The voice engine processor 202 also depacketizes, decompresses and performs digital-to-analog conversion upon voice information from the network such that the voice information may be listened via speaker 212, as also described in detail below.

The Internet Protocol switch controller 201 substantially comprises a network switch which is capable of adding tags to network data packets, as well as reading existing tags of network packets. Priority is applied to the network packets via the use of such tags and existing priority information is read from network packets having such tags.

The Internet Protocol switch controller 201 may be configured to accommodate maximum frame sizes of both 1522 and 1548 bytes.

1522 bytes maximum frame length supports the IEEE 802.3ac VLAN tag specification while 1548 bytes allow alternate tagging schemes, with up to 30 bytes of tag field (i.e., user's ISL). Generally, packetized voice will consist of minimax data frames generally of 64 bytes, or 68 bytes with the 802.3ac tag.

The Internet Protocol switch controller 201 interfaces with the voice engine processor 202 via a data interface, such as media independent interface 203 and with a control interface, such as microprocessor interface 204. Those skilled in the art will appreciate that various other types of interfaces for facilitating communication between the Internet Protocol switch controller 201 and the voice engine processor 202 are likewise suitable.

Magnets 207 and 208 provide DC isolation and impedance matching at media dependent interfaces 313 and 314, respectively. Media dependent interface 313 facilitates connection to the personal computer 102 (FIG. 1) or the like via network interface adapter (NIC) connection 205 and media dependent interface 314 similarly provides communication to a network, e.g., network switch 103 via switch connector 206.

The voice engine processor 202 is in communication with keypad 209, which is used to facilitate desired routing of the voice packets from the network telephone 101, through the network, to a desired recipient. It is worthwhile to note that the desired recipient may be a similar Internet telephone, a computer such as a personal computer 102, a server which archives the voice packets for later use, or a conventional telephone accessed via the public switched telephone network. The voice data provided by the network telephone 101 may leave the network and be transmitted via the public switch telephone system.

Indeed, a voice message provided by the network telephone 101 may, if desired, be converted into a text message via voice recognition software. The text message may then be routed to a computer, such as via e-mail, may be routed to a fax machine, may be routed to an alpha/numeric pager or may be routed to any other desired text device.

The Internet connection between the network telephone 101 and the personal computer 102 preferably includes an Ethernet 10/100 connection. Similarly, the connection between the Internet telephone 101 and the network switch 103 preferably includes an Ethernet 10/100 connection.

The keypad 209 may be a contemporary keypad such as those used upon standard telephones. However, the keypad 209 may alternatively be any desired input device, such as a computer keyboard, a voice recognition system, a rotary dial, or any other desired input device.

The LCD display 210 is utilized to display the dialed number, as well as any other desired information such as network status, caller identification, etc.

Figure 3:
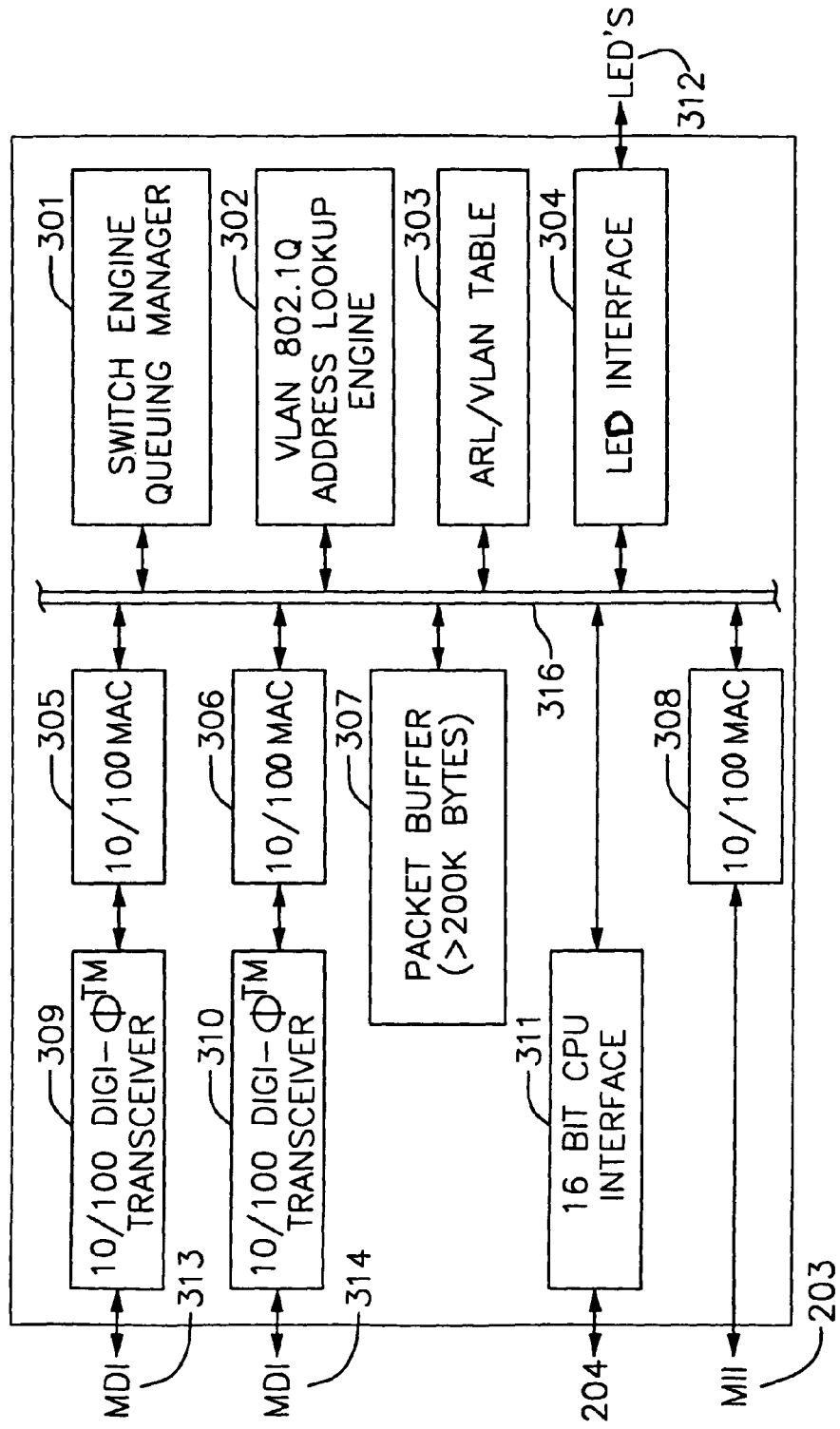
FIG. 3 is a block diagram showing the Internet Protocol switch controller of the present invention.

Referring now to FIG. 3, the Internet Protocol switch controller 201 is shown in further detail. The Internet Protocol switch controller 201 comprises a bus 316 for facilitating communication among various portions thereof. The Internet Protocol switch controller 201 generally defines a network switch and has a switch engine queuing manager 301, a VLAN 802.1Q address look-up engine 302, an address resolution logic/virtual local area network (ARL/VLAN) table 303, an LED interface 304, a first 10/100 MAC 305, a second 10/100 MAC 306, a packet buffer 307, a 16-bit CPU interface 311 and a third 10/100 MAC 308, all in communication with the bus 316, so as to facilitate communication among one another.

The switch engine queuing manager 301 and the packet buffer 307 are configured to cooperate with one another so as to facilitate communication of network packets through the Internet Protocol switch controller 201 and to facilitate insertion of voice data packets onto the network without blocking of the network packets. An integrated address resolution unit is coupled to provide medium access control addresses and VLAN tag resolution at line rate. The integrated address resolution unit is configured to support ingress timestamp which in turn allows the queuing manager 301 to support egress delay flush. The integrated address resolution unit may configured to provide 256 medium access control addresses with a 16 bit tag.

The switch engine queuing manager 301 prioritizes packets going into the packet buffer 307. Thus, the switch engine queuing manager 301 defines a prioritization circuit. This prioritization applies to both voice data generated at the network telephone 101 by a user and voice data coming into the network telephone 101 from the network (if not already prioritized). Voice data may be recognized as such by the port it is received on (i.e., the MII port 203) by an identification header of the data packet which identifies the data contained within the packet as voice data or by associating either the source or destination of the packet as a voice device, e.g., a network telephone.

It should be appreciated that both non-voice data, such as that generated by the personal computer 102 and communicated to the network, as well as that provided by the network to the personal computer 102, passes through the network telephone 102 because of its serial connection between the personal computer 102 and the network switch 103. Thus, all such data must be processed by the Internet Protocol switch controller 201 of the network phone 101. It is important that voice data be given a higher priority than non-voice data, since such voice data is time critical, i.e., should pass through the network without unnecessary delay.

The avoidance of such delay is necessary so as to provide the desired degree of quality of service. As those skilled in the art will appreciate, a minimum threshold of quality of service is necessary in order to make use of the network telephone 101 worthwhile and desirable. The introduction of undesirable delays in voice packets transmitted over the network tends to cause a reduction in quality of service which may, if excessive, make use of the network telephone 101 undesirable.

The VLAN 802.1Q address look-up engine 302 utilizes the ARL/VLAN table 303 to facilitate desired routing of voice packets, as well as non-voice packets, across the network.

The LED interface 304 facilitates the use of LEDs 312 which may be utilized to provide any desired indication, such as transmit (TX), receive (RX) and status (network OK).

The search engine queuing manager 301 stores packets in the packet buffer 307 prior to the packets being sent to their destination, whether that destination is the voice engine processor 202 or the network. The packet buffer generally has a capacity greater than 200 Kbytes.

The 16-bit CPU interface 311 forms a portion of the microprocessor interface 204 which facilitates communication of control signals between the Internet Protocol switch controller 201 and the voice engine processor 202. The CPU interface 311 may be configured to facilitate the use of SNMP and BPDU frames. The CPU interface 311 may have counters coupled to provide RMON support.

The media independent interface 203 facilitates the communication of data, e.g., voice packets, between the Internet Protocol switch controller 201 and the voice engine processor 202. The media independent interface facilitates such communication via 10/100 MAC 308.

First media dependent interface 313 and second media dependent interface 314 facilitate communication with the personal computer 102 and the network switch 103, respectively. Media dependent interface 313 facilitates data communication via 10/100 Ethernet transceiver 309 and 10/100 MAC 305. Similarly, media dependent interface 314 facilitates data communication via 10/100 Ethernet transceiver 310 and 10/100 MAC 306.

The Internet Protocol switch VLAN tag frame format is generally defined in IEEE 802.3ac and 802.1Q. A four byte field is utilized and the tag is inserted between the source address (SA) and the original type-length field of the frame. The tag is split into two 16 bit fields. The first field is a VLAN tag protocol identified (TPID) and the second field is the tag control information (TCI), which contains the VLAN identifier (typically 12 bits), a 3-bit user priority field, and one CFI (Canonical Format Indicator) bit, which is generally not used in Ethernet networks.

Figure 4:
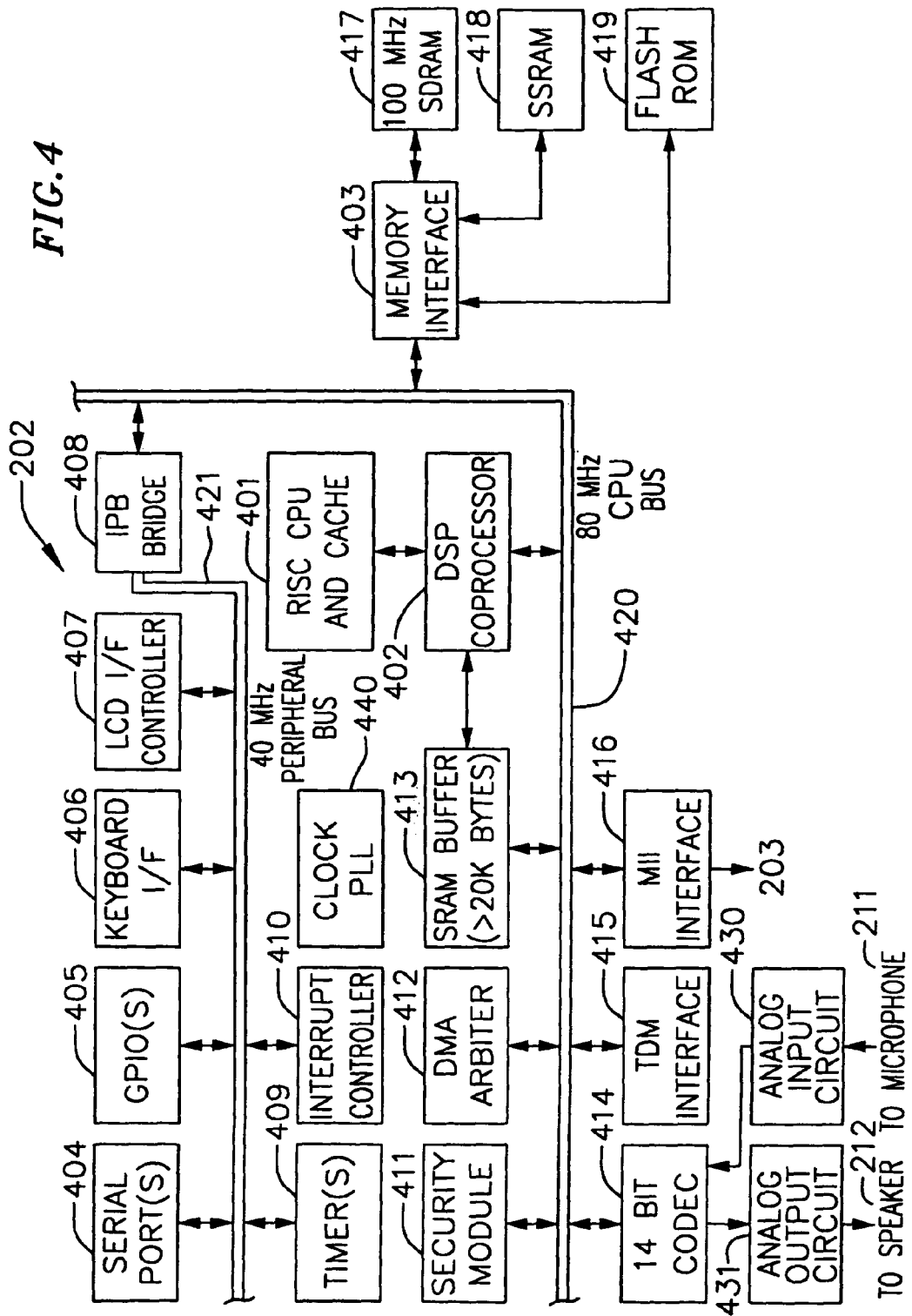
FIG. 4 is a block diagram showing the voice engine processor of the present invention.

Referring now to FIG. 4, the voice engine processor 202 comprises a CPU bus 420, which preferably operates at approximately 80 MHZ and a peripheral bus 421, which preferably operates at approximately 40 MHZ. An internal peripheral bridge 408 facilitates communication between the peripheral bus 421 and the CPU bus 420.

A CPU 401, preferably a RISC CPU having built-in cache such as a MIPS R3000, is in communication with the CPU bus 420 through DSP coprocessor 402. By using the DSP coprocessor 402, which cooperates with the CPU 401 the need for a off-chip DSP is eliminated.

At least one serial port 404, at least one general purpose input/output 405, a keyboard interface 406, at least one clock or timer 409, interrupt controller 410 and an LCD interface controller 407 are in communication with the peripheral bus 421. An on-chip PLL 440 may be used to provide a plurality of different clock speeds, e.g., 25 MHz, 33 MHz and 50 MHz.

A security module 411, a DMA arbiter 412, more than 20 Kbytes of SRAM buffer 413, a 14-bit CODE, a time division multiplexor interface 415 and a media independent interface 416 are in communication with the CPU bus 420. Also, a memory interface 403 which facilitates interface to 100 MHZ SDRAM 417, SSRAM 418 and flash ROM 419 is also in communication with the CPU bus 420.

The serial port 404 facilitates programming of the flash ROM 419, as well as debugging of the network telephone 101, particularly the operation of the voice engine processor 202 thereof.

The general purpose input/output(s) 405 allow the voice engine processor 202 to control external devices and/or to accept input from external devices, as desired.

The keyboard interface 406 facilitates electrical communication with keypad 209 and the LCD interface controller 407 facilitates communication with the LCD display 210.

The timer(s) 409 provide the clock signal(s) necessary for operation of the serial port(s) 404, GPIO(s) 405, keyboard interface 406, LCD interface controller 407 and interrupt controller 410. The interrupt controller 410 provides interrupts for the serial port(s) 404, GPIO(s) 405, keyboard interface 406 and LCD interface controller 407.

The GPIO(s) 405 facilitate debugging, the use of external devices such as LED indicators and other desired customer specific external logic.

The security module 411 applies encryption, preferably according to the defense encryption standard (DES) utilizing either single or triple DES and also facilitates decryption of encrypted data.

The DMA (Direct Memory Access) arbiter 412 controls access to the CPU bus 420 so as to facilitate direct memory access operations.

The SRAM buffer 413 provides temporary storage for voice data as it is processed by the security module 411 and/or the CPU 401 and the DSP co-processor 402.

In the transmit direction, CODEC 414 performs analog-to-digital conversion and filters the digital samples. In the receive direction, the CODEC 414 filters the received digital samples taken from the co-processor and then performs digital-to-analog conversion.

The DSP co-processor 402 is used to compress the voice data.

The CODEC 414 may be a G.711 CODEC and facilitates compression of voice data provided by the microphone 211 and facilitates decompression of voice data provided to the speaker 212. The CODEC 414 optionally also facilitates desired filtering of the voice packets provided by microphone 214, particularly so as to decrease the bandwidth necessary for transmission thereof.

Analog input circuit 430 receives an analog voice signal from the microphone 211 and conditions the signal for input to the CODEC 414. The analog input circuit 430 optionally filters and/or amplifies the analog voice signal before the analog voice signal is provided to the CODEC 414.

The analog output circuit 431 receives an analog signal from the CODEC 414 and provides the analog signal to speaker 212. The analog output circuit 431 optionally amplifies and/or filters the analog signal prior to providing the analog signal to the speaker 212.

The analog input circuit 430 and the analog output circuit 431 may be formed separate and external with respect to the voice engine processor 202, if the voice engine processor 202 is formed as a single chip.

The TDM interface 415 facilitates the handling of time division multiplexed data packets communicated upon the CPU bus 420 according to contemporary methodology.

The media independent interface 416 facilitates the communication of voice data packets between the voice engine processor 202 and the Internet Protocol switch controller 201.

The 100 MHZ SDRAM 417 provides a storage place for packetized voice data. The SSRAM 418 provides program memory for network related operations executed by the CPU 401. The flash ROM 419 is used to store program instructions for the RISC CPU 401 which are likely to need periodic updating.

As those skilled in the art will appreciate, the 14-bit DSP co-processor 402 may perform various different types of voice compression. For example, the CODEC 414 may utilize pulse code modulation (PCM), differential pulse code modulation (DPCM), adaptive differential pulse code modulation (ADPCM), motion picture experts group (MPEG) audio compression, linear predictive coding (LPC), code-excited linear prediction (CELP) and low-delay code-excited linear prediction (LD-CELP).

Of course, silence suppression is included in any type of audio compression. Those skilled in the art will appreciate that various other types of voice compression may likewise be suitable. The voice engine processor 202 is configured to provide echo control.

The voice engine processor 202 may optionally be configured to provide signaling for voice traffic, such as PBX voice traffic.

Figure 5:
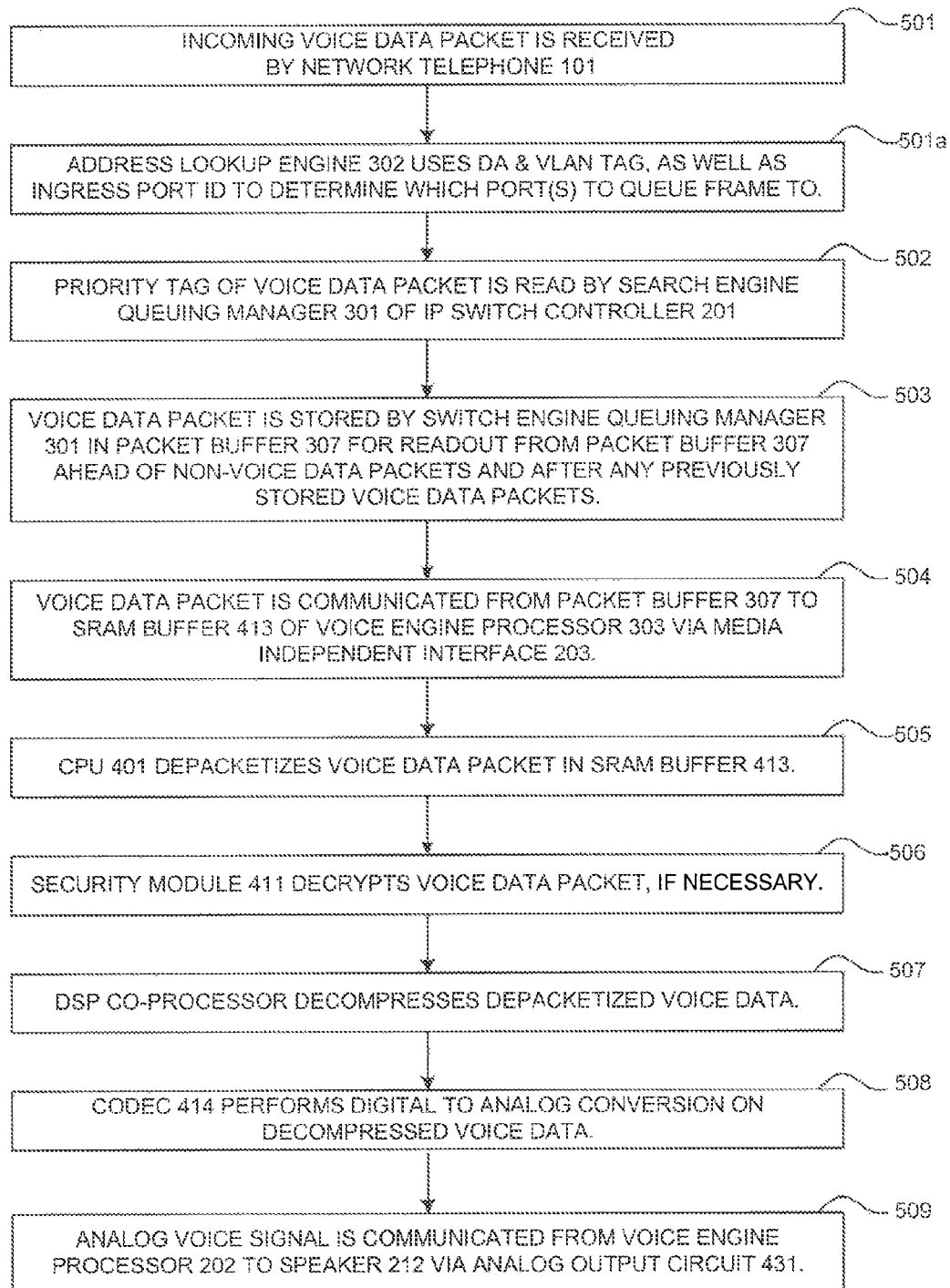
FIG. 5 is a flowchart showing processing for an incoming voice packet.

Referring now to FIG. 5, the processing of an incoming voice data packet by the network telephone 101 is shown. As shown in block 501, an incoming voice data packet is received by the network telephone 101. This incoming voice data packet is typically received via the media dependent interface 314 which facilitates communication with the network. Thus, the incoming voice data packet typically originates elsewhere upon the network, such as at another network telephone. However, such incoming voice data packets may alternatively originate at the personal computer 102 (such as by using the personal computer itself as a network telephone) or may originate at various network devices such as other computers (which are similarly utilized as network telephones) or servers which may have previously archived the voice data packet.

Regardless of the source of the incoming data packet. The address lookup engine will use the various DA and VLAN tag fields, as well as the ingress port identity (and possibly SA field), to determine which port(s) to queue the packet to, and whether to place it on the high or low priority queue(s) of the determined egress port(s). The priority tag of the voice data packet, if present, is read by the search engine queuing manager 301 of the IP switch controller 201 as shown in block 502. If the priority tag indicates that the packet contains voice data and therefore should be processed with high priority, the packet will be stored on the high priority queue. Processing with high priority includes placing voice data packets ahead of other, lower priority packets in buffers, such that voice data packets are read from the buffers before other, non-voice data packets. In this manner, undesirable delays of the voice data packets are mitigated.

Thus, as shown in block 503, the voice data packet is stored by switch engine queuing manager 301 in packet buffer 307 for read-out from packet buffer 307 ahead of non-voice data packets and after any previously stored voice data packets. In this manner, voice data packets are read ahead of non-voice data packets and the order of voice data packets is maintained.

Since it is possible for voice data packets to arrive at the network telephone 101 out of order, the switch engine queuing manager 301 also places arriving packets in the packet buffer 307 in order, to the extent possible. The order of voice data packets is indicated in a header thereof. If a later transmitted voice data packet arrives before an earlier transmitted voice data packet, then the earlier transmitted voice data packet is placed in the voice data packet buffer 307 ahead of the later transmitted voice data packet. In this manner, the switch engine queuing manager 301 attempts to maintain desired order of the voice data packets, such that undesirable disruptions of received speech are mitigated. Of course, if an earlier transmitted voice data packet arrives after a later transmitted voice data packet has already been read from packet buffer 307 (and has generally already been listened to via speaker 212), then the earlier transmitted voice data packet must be deleted, e.g., not stored in packet buffer 307, so as to mitigate further degradation of the incoming voice data stream.

If the address lookup 302 determines the packet is destined for internet telephone 101, it will queue the packet to the MII port 203, and directs the queuing manager 301 to place it on the high priority queue for that port, assuming its priority field indicated this. After the voice data packets have been queued ahead of non-voice data packets and stored in order, to the extent possible, the voice data packets are communicated from the packet buffer 307 to SRAM buffer 413 of the voice engine processor 202 via media independent interface 203, as show in block 504. Voice data packets may also be stored in the 100 MHZ SDRAM, as necessary to prevent over flowing of the SRAM buffer 413. The voice engine processor processes the voice data packets so as to provide a voice signal compatible with speaker 212 to facilitate listening to the received voice signal. Such processing is performed by the CPU 401 and the DSP coprocessor 402 by executing instructions stored in the SSRAM 418 and flash ROM 419 while operating upon voice data packets stored in SRAM buffer 413. Additionally, voice data packets are transferred from the 100 MHZ SDRAM 417 to the SRAM buffer 413 as necessary to facilitate further processing thereof.

As shown in block 505, the CPU 401 of the voice engine processor 202 facilitates de-packetizing of the voice data packets stored in SRAM buffer 413.

As shown in block 506, if the voice data packets are encrypted, then the security module 401 decrypts the voice data packets.

As shown in block 507, DSP co-processor 402 decompresses packetized voice data. If only pulse code modulation (PCM) is used, then such decompression inherently results in digital-to-analog conversion of the voice signal. However, if more sophisticated voice compression is utilized, then CODEC 414 performs decompression of the voice signal and then performs digital-to-analog conversion thereof, as shown in block 508.

As shown in block 509, the decompressed analog signal is provided to analog output 431 which conditions, e.g., filters, amplifies and/or attenuates, the signal such that the signal is suitable for speaker 212.

Figure 6:
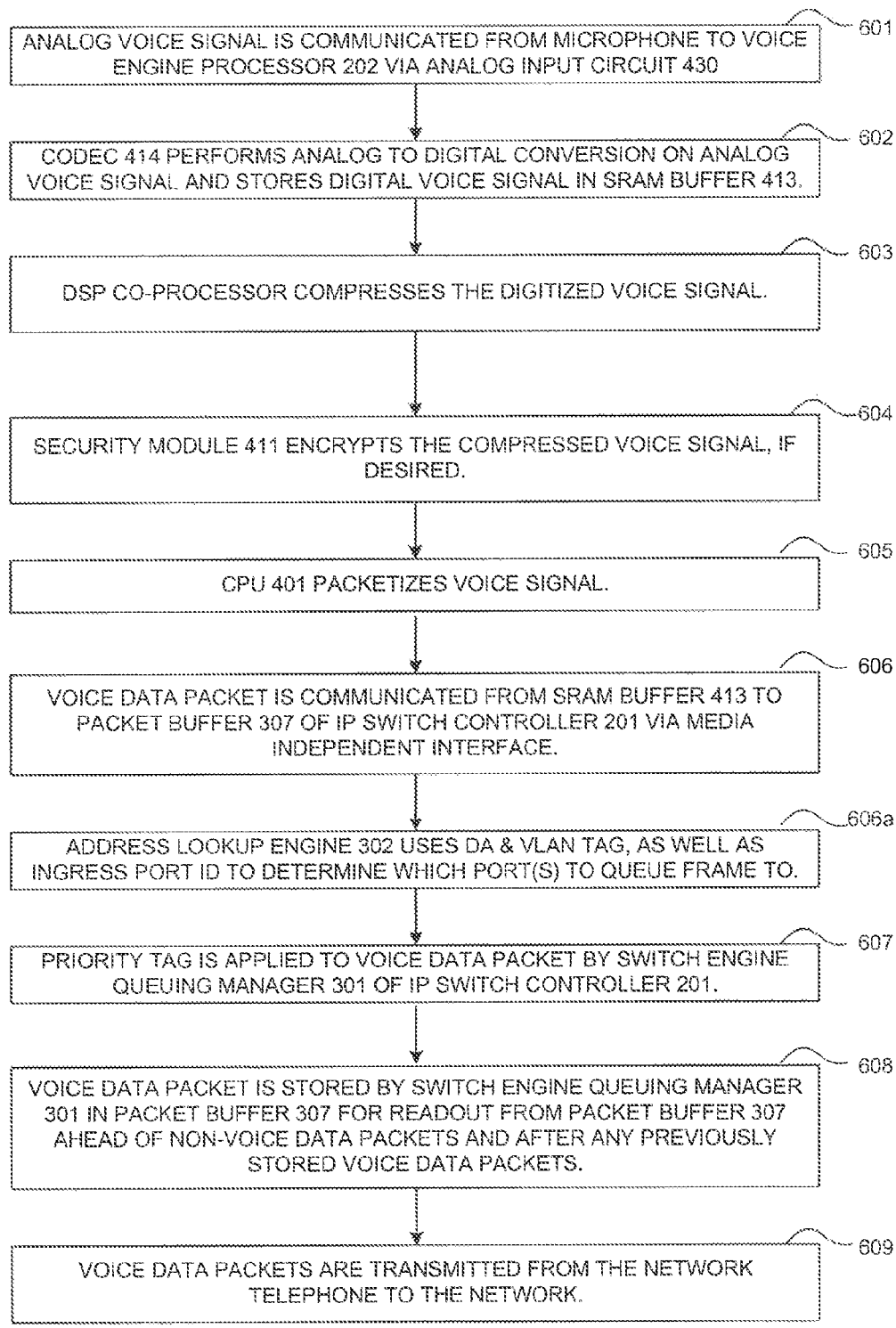
FIG. 6 is a flowchart showing processing for an outgoing voice data packet.

Referring now to FIG. 6, the processing of outgoing voice data from the network telephone 101 is generally the reverse of the processing of incoming voice data, as shown in FIG. 5.

More particularly, as shown in block 601 an analog voice signal which results from talking into microphone 211 is communicated from microphone 211 to voice engine processor 202 via analog input circuit 430. The analog input circuit 430 conditions the output of microphone 211 so as to be suitable for processing by CODEC 414 of the voice engine processor 202. Thus, the analog input circuit 430 filters, amplifies and/or attenuates the analog voice signal communicated from the microphone.

As shown in block 602, CODEC 414 performs analog-to-digital conversion on the analog voice signal and stores the digital voice signal in SRAM buffer 413. If only PCM voice compression is utilized, then the analog-to-digital conversion process results in a compressed digital voice signal.

As shown in block 603, if more sophisticated compression is utilized, then DSP co-processor 402 compresses the digitized voice signal, utilizing such voice compression.

As shown in block 604, security module 411 encrypts the compressed voice signal, if desired. Defense encryption standard (DES) or triple DES are utilized. However, those skilled in the art will appreciate that various other types of encryption are likewise suitable and may either alternatively or additionally be utilized.

As shown in block 605, CPU 401 packetizes the voice signal, such that the voice signal is suitable for transmission over a network, such as the Internet.

As shown in block 606, the voice data packet is communicated from the SRAM buffer 413 and/or 100 MHZ SDRAM to the packet buffer 307 of the IP switch controller 201, via media independent interface 203.

The address lookup engine 302 uses the DA, VLAN tag and ingress port to determine the egress port(s) to which the frame must be queued, and informs the switch engine queuing manager 301 of this decision, as well as whether to queue as high or low priority. In general, all packets originating from internet telephone 101 will be tagged as high priority.

As shown in block 607, a priority tag is applied to the voice data packet by the search engine queuing manager 301 of the IP switch controller 201. Routing information may also be applied to the voice data packet by the queuing manager, in accordance with the instructions from the VLAN 802.1Q address lookup engine 302 and the ARL/VLAN table 303.

As shown in block 608, the voice data packet is stored by switch engine queuing manager 301 and packet buffer 307 for read-out from packet buffer 307 ahead of non-voice data packets (which may have arrived from either the network or personal computer 102) and after any previously stored voice data packets. In this manner, the priority necessary to maintain the desired quality of service and to prevent undesirable degradation of the voice signal is provided.

It is worthwhile to note that other data packets, besides those originating at the network telephone 101 may be stored in packet buffer 307 and then transmitted to the network. For example, data packets provided by personal computer 102 must be transmitted, without detrimental alteration, to switch 103 of the network. The switch engine queuing manager 301 may, optionally, apply a desired priority tag to such non-voice data packets which originated at the personal computer 102. These non-voice data packets will be assigned a priority lower than that of the voice data packets which originate at the network telephone 101.

As shown in block 609, voice data packets are transmitted from the network telephone to the network, via media dependent interface 314, which typically facilitates transmission of the voice data packets to switch network 103 or any other desired network device. The voice data packets are then routed by switch 103 using routing information, such as that applied by the VLAN address look-up table 302 to the voice data packets according to contemporary methodology.

Figure 7:
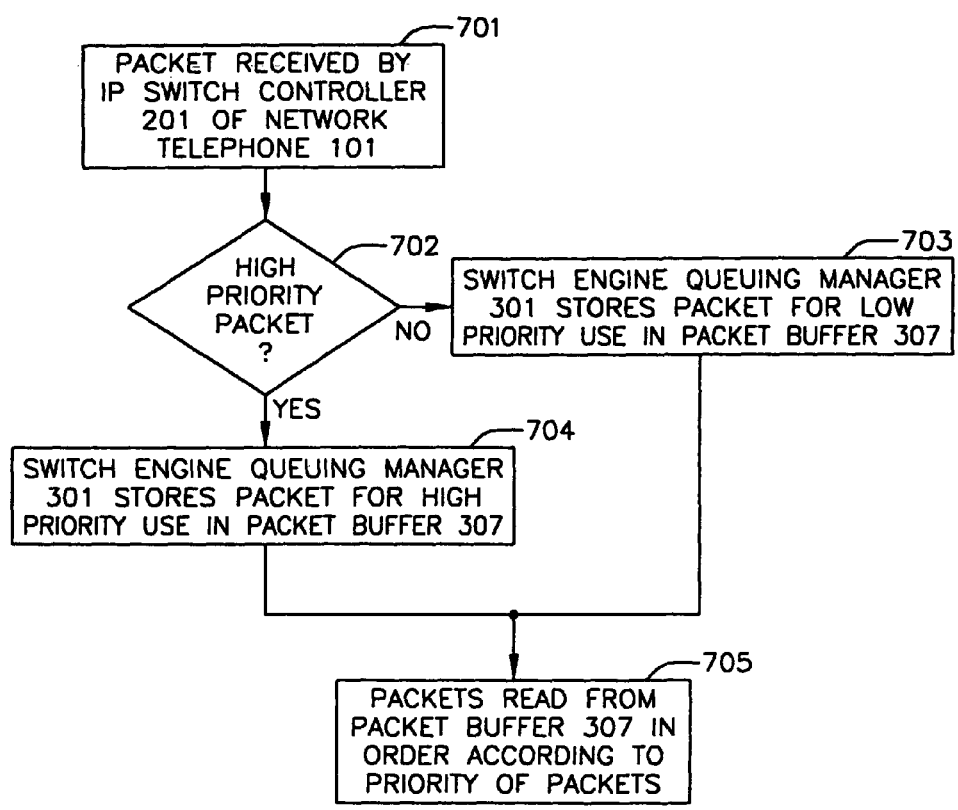
FIG. 7 is a flowchart showing differences in processing for low priority (non-voice data) and high priority (voice data) packets.

Referring now to FIG. 7, the application of priority tags to data packets passing through the network telephone 101 is shown. The priority tags are applied by the switch engine queuing manager 301 prior to storing the data packets in packet buffer 307.

As shown in block 701, packets are received by the IP switch controller 201 of the network telephone 101. These packets may be received from the network, the personal computer 102 or the voice engine processor 202 (which occurs when the packets originate at the network telephone 101 and are the result of speech from the microphone 211, or entries on the keypad 209, being processed by voice engine processor 202).

As shown in block 702, high priority packets are processed differently from low priority packets. High priority packets are voice data packets and low priority packets are non-voice data packets. If the packet received by the IP switch controller 201 is a non-voice data packet (as indicated by the packet header or routing information), then processing is transferred to block 703, wherein the switch engine queuing manager 301 stores the packet for low priority use in the packet buffer 307.

Storing the packet for low priority use may be accomplished by storing the packet in a dedicated low priority portion of the packet buffer 307, may comprise maintaining a table of the storage location of the low priority packet such that the packet may later be recognized as a low priority packet or may include the application of a priority tag to the packet, such that the packet is readily recognized as a low priority packet.

As shown in block 704, when the packet is recognized as a high priority packet, i.e., a voice data packet, by block 702, then the switch engine queuing manager 301 stores the packet for high priority use in packet buffer 307. Similarly, the high priority packet may be stored in a dedicated high priority portion of the packet buffer 307, a table may be maintained designating where high priority packets are stored within the packet buffer 307, or a tag may be applied to the packet such that the packet may be readily identified as a high priority packet.

As shown in block 705, packets are read from the packet buffer 307 in order, according to priority of the packets. That is, high priority packets are read from the packet buffer 307, generally in order of their reception, and then low priority packets are read from the packet buffer 307. Thus, higher priority voice data packets are read from the packet buffer 307 and are processed prior to reading lower priority non-voice data packets from the packet buffer 307 and processing the lower priority non-voice data packets.

Note that while FIG. 7 shows only two levels of priority, high and low, the 3-bit user priority field in the 802.3ac/802.1Q tag allows eight levels of priority to be encoded, and the IP switch could be extended to support these multiple priority queues.

It is understood that the exemplary network telephone system described herein and shown in the drawings represents only a presently preferred embodiment of the invention. Indeed, various modifications and additions may be made to such embodiment without departing from the spirit and scope of the invention.

The invention claimed is:

1. A switch controller for communicating data packets over a network, comprising:
    a switch engine queuing manager configured to determine whether received data packets are voice data packets or non-voice data packets and to prioritize the voice data packets according to a first priority and the non-voice data packets according to a second priority, the first priority being higher than the second priority;
    a packet buffer including a high priority queue and a low priority queue, the switch engine queuing manager being configured to store the voice data packets into the high priority queue and the non-voice data packets into the low priority queue; and
    an address lookup engine configured to queue the voice data packets and the non-voice data packets to one or more ports and to read the voice data packets from the high priority queue before reading the non-voice data packets from the low priority queue.

2. The switch controller of claim 1, wherein the switch engine queuing manager is further configured to determine whether the received data packets are the voice data packets or the non-voice data packets based upon one or more fields embedded within the received data packets.

3. The switch controller of claim 2, wherein the one or more fields are priority tag fields.

4. The switch controller of claim 1, wherein the switch engine queuing manager is further configured to determine the received data packets are the voice data packets when a priority tag field of the received data packets indicates the received data packets includes voice data.

5. The switch controller of claim 1, wherein the switch engine queuing manager is further configured to determine the received data packets are the non-voice data packets when a priority tag field of the received data packets indicates the received data packets includes non-voice data.

6. The switch controller of claim 1, wherein the switch engine queuing manager is further configured to determine the received data packets are the voice data packets or the non-voice data packets based upon an identity of one or more second ports that received the received data packets.

7. The switch controller of claim 1, wherein the switch engine queuing manager is further configured to cause the packet buffer to store the voice data packets into the high priority queue in an order the voice data packets were transmitted.

8. The switch controller of claim 7, wherein the switch engine queuing manager is further configured to cause the packet buffer to store a later received voice data packet before an earlier received voice data packet when the later received voice data packet was transmitted before the earlier received voice data packet.

9. A method for communicating data packets over a network, comprising:
  (a) determining whether received data packets are voice data packets or non-voice data packets;
  (b) prioritizing the voice data packets according to a first priority and the non-voice data packets according to a second priority, the first priority being higher than the second priority;
  (c) storing the voice data packets into a high priority queue and the non-voice data packets into a low priority queue, the high priority queue and the low priority queue being implemented as part of a memory device; and
  (d) queuing the voice data packets and the non-voice data packets to one or more ports by reading the voice data packets from the high priority queue before reading the non-voice data packets from the low priority queue.

10. The method of claim 9, wherein step (a) comprises:
  (a)(i) determining whether the received data packets are the voice data packets or the non-voice data packets based upon one or more fields embedded within the received data packets.

11. The method of claim 10, wherein step (a)(i) comprises:
  (a)(i)(A) determining whether the received data packets are the voice data packets or the non-voice data packets based upon one or more priority tag fields embedded within the received data packets.

12. The method of claim 9, wherein step (a) comprises:
  (a)(i) determining the received data packets are the voice data packets when a priority tag field of the received data packets indicates the received data packets includes voice data.

13. The method of claim 9, wherein step (a) comprises:
  (a)(i) determining the received data packets are the non-voice data packets when a priority tag field of the received data packets indicates the received data packets includes non-voice data.

14. The method of claim 9, wherein step (a) comprises:
  (a)(i) determining the received data packets are the voice data packets or the non-voice data packets based upon an identity of one or second more ports that received the received data packets.

15. The method of claim 9, wherein step (c) comprises:
  (c)(i) storing the voice data packets into the high priority queue in an order the voice data packets were transmitted.

16. The method of claim 15, wherein step (c)(i) comprises:
  (c)(i)(A) storing a later received voice data packet before an earlier received voice data packet when the later received voice data packet was transmitted before the earlier received voice data packet.

17. A switch controller for communicating data packets over a network, comprising:
  means for determining whether received data packets are voice data packets or non-voice data packets;
  means for prioritizing the voice data packets according to a first priority and the non-voice data packets according to a second priority, the, first priority being higher than the second priority;
  means for storing the voice data packets into a high priority queue and the non-voice data packets into a low priority queue;
  means for queuing the voice data packets and the non-voice data packets to one or more ports; and
  means for reading the voice data packets from the high priority queue before reading the non-voice data packets from the low priority queue.

18. The switch controller of claim 17, wherein the means for determining is configured to determine whether the received data packets are the voice data packets or the non-voice data packets based upon one or more fields embedded within the received data packets.

19. The switch controller of claim 18, wherein the one or more fields are priority tag fields.

20. The switch controller of claim 17, wherein the means for determining is configured to determine the received data packets are the voice data packets when a priority tag field of the received data packets indicates the received data packets includes voice data.

21. The switch controller of claim 17, wherein the means for determining is configured to determine the received data packets are the non-voice data packets when a priority tag field of the received data packets indicates the received data packets includes non-voice data.

22. The switch controller of claim 17, wherein the means for determining is configured to determine the received data packets are the voice data packets or the non-voice data packets based upon an identity of one or more second ports that received the received data packets.

23. The switch controller of claim 17, wherein the means for determining is configured to cause the means for storing to store the voice data packets into the high priority queue in an order the voice data packets were transmitted.

24. The switch controller of claim 23, wherein the means for determining is configured to cause the means for storing to store a later received voice data packet before an earlier received voice data packet when the later received voice data packet was transmitted before the earlier received voice data packet.

* * * * *